(12) United States Patent
Oda

(10) Patent No.: US 8,115,614 B2
(45) Date of Patent: Feb. 14, 2012

(54) TIRE INFORMATION MANAGEMENT SYSTEM

(75) Inventor: Keiji Oda, Shirakawa (JP)

(73) Assignee: Bridgestone Corporation, Tokyo (JP)

( * ) Notice: Subject to any disclaimer, the term of this patent is extended or adjusted under 35 U.S.C. 154(b) by 383 days.

(21) Appl. No.: 12/444,291

(22) PCT Filed: Oct. 2, 2007

(86) PCT No.: PCT/JP2007/069264
§ 371 (c)(1),
(2), (4) Date: Apr. 3, 2009

(87) PCT Pub. No.: WO2008/044540
PCT Pub. Date: Apr. 17, 2008

(65) Prior Publication Data
US 2010/0033316 A1    Feb. 11, 2010

(30) Foreign Application Priority Data
Oct. 4, 2006    (JP) ................................ 2006-273047

(51) Int. Cl.
*B60C 23/00* (2006.01)
(52) U.S. Cl. ............................ 340/447; 340/442; 73/146
(58) Field of Classification Search .......... 340/442–447; 73/146–146.8
See application file for complete search history.

(56) References Cited

U.S. PATENT DOCUMENTS

| | | | |
|---|---|---|---|
| 6,112,585 A * | 9/2000 | Schrottle et al. | 73/146 |
| 7,265,660 B2 * | 9/2007 | Watanabe | 340/447 |
| 7,385,485 B2 * | 6/2008 | Thomas et al. | 340/426.33 |
| 7,498,931 B2 * | 3/2009 | Kovac et al. | 340/442 |
| 2005/0078002 A1 | 4/2005 | Okubo | |
| 2005/0156724 A1 * | 7/2005 | Shibata | 340/447 |
| 2006/0048567 A1 | 3/2006 | Shimura | |
| 2006/0071768 A1 * | 4/2006 | Iwazumi et al. | 340/447 |
| 2006/0082451 A1 * | 4/2006 | Shaw | 340/449 |
| 2006/0132325 A1 | 6/2006 | Fujii et al. | |
| 2007/0008097 A1 * | 1/2007 | Mori et al. | 340/505 |
| 2008/0055061 A1 * | 3/2008 | Kovac et al. | 340/447 |

FOREIGN PATENT DOCUMENTS

| | | |
|---|---|---|
| JP | 10-104103 A | 4/1998 |
| JP | 2004-145474 A | 5/2004 |

(Continued)

*Primary Examiner* — Eric M Blount
(74) *Attorney, Agent, or Firm* — Sughrue Mion, PLLC (57) ABSTRACT

In a tire information management system 10 of the present invention, a vehicle side module 5 includes a receiving electromagnetic wave strength measuring means 12 for measuring, for each sensor module 3, receiving electromagnetic wave strength of data signals transmitted from the sensor module 3 and is adapted to generate a transmitting electromagnetic wave strength set value to be employed in the next data transmission by the sensor module in accordance with the receiving electromagnetic wave strength of the data signals transmitted from the sensor module and add the transmitting electromagnetic wave strength set value to a command to the sensor module at the next request of data transmission thereto. The sensor module 3 includes a transmitting electromagnetic wave strength control means 16 for controlling transmitting electromagnetic wave strength in data transmission. The transmitting electromagnetic wave strength control means 16 is adapted to control transmitting electromagnetic wave strength during next data transmission on the basis of a transmitting electromagnetic wave strength set value received from the vehicle side module. As a result, the present invention provides a tire information management system that allows electricity consumption at the sensor module to be significantly reduced, whereby the product life of the sensor module is significantly improved.

5 Claims, 6 Drawing Sheets

FOREIGN PATENT DOCUMENTS

| | | |
|---|---|---|
| JP | 2004-291768 A | 10/2004 |
| JP | 2004-314771 A | 11/2004 |
| JP | 2005-119370 A | 5/2005 |
| JP | 2005-178635 A | 7/2005 |
| JP | 2006-62533 A | 3/2006 |
| JP | 2006-174154 A | 6/2006 |

* cited by examiner

TIRE INFORMATION MANAGEMENT SYSTEM

TECHNICAL FIELD

The present invention relates to a tire information management system having: a sensor module provided inside each tire mounted in a vehicle, for measuring tire condition variables including tire inner pressure and transmitting data obtained by the analysis; an antenna for receiving the data from the sensor module; and a vehicle side module for commanding transmission of the data to each sensor module by way of the antenna and obtaining the data transmitted from each sensor module.

PRIOR ART

There has been a tire information management system in which, for managing running tires of a vehicle such as a construction vehicle, a sensor module for measuring tire condition variables such as inner pressure of the tire is provided on an inner surface of the tire, data obtained by the analysis transmitted from the sensor module is received as signals by a vehicle side module, so that a driver is informed of abnormality in the tire based on the signals and/or the signals are used for managing a state of tire in use or the like (for example, JP 10-104103).

DISCLOSURE OF THE INVENTION

Problems To Be Solved By the Invention

In such a tire information management system as described above, it is difficult to supply electric power from the vehicle body side to a sensor module provided in a tire which rotates. The sensor module is thus driven by a primary cell installed therein. Further, a sensor module is generally subjected to potting with a resin to protect electronic members installed therein from moisture, gas, dusts and the like, whereby the primary cell in the sensor module is not replaceable. Due to this, the product life of a sensor module has to depend on that of the product life of the primary cell.

Since a primary cell must be light, the volume thereof cannot be simply increased. Therefore, in order to prolong the product life of a primary cell, it is important to suppress electricity consumption at the sensor module. There have been made various proposals in this regard, but none of them can suppress electricity consumption in a satisfactory level yet.

Regarding the problem above, the inventor of the present invention realized a fact that, in the conventional technique, strength of transmitting electromagnetic wave during transmission of data signals to a vehicle side module by a sensor module is normally set at as large a value as possible or acceptable so that data transmission should not be affected at whichever vehicle or at whichever tire mounting position in a vehicle the sensor module is mounted and that this strength of transmitting electromagnetic wave cannot be so easily changed.

The present invention has been contrived based on the discovery described above. An object of the present invention is to provide a tire management system which allows electricity consumption by a sensor module to be significantly reduced, thereby significantly improving the product life of a sensor module.

Means For Solving the Problem

In a first <1> aspect of the present invention, a tire information management system having: a sensor module provided inside each tire mounted in a vehicle, for measuring tire condition variables including tire inner pressure and transmitting data obtained by the analysis; an antenna for receiving the data from the sensor module; and a vehicle side module for transmitting a command, requesting transmission of the data, to each sensor module by way of the antenna and obtaining the data transmitted from each sensor module, characterized in that the sensor module includes a transmitting electromagnetic wave strength control means for controlling transmitting electromagnetic wave strength in data transmission, the transmitting electromagnetic wave strength control means being adapted to control transmitting electromagnetic wave strength for next data transmission on the basis of a transmitting electromagnetic wave strength set value received from the vehicle side module; the vehicle side module includes a receiving electromagnetic wave strength measuring means for measuring, for each sensor module, receiving electromagnetic wave strength of data signals transmitted from the sensor module and is adapted to generate a transmitting electromagnetic wave strength set value in accordance with the receiving electromagnetic wave strength of the data signals transmitted from the sensor module and add the transmitting electromagnetic wave strength set value to the command to the sensor module at the next request of data transmission thereto.

In a second <2> aspect of the present invention, the vehicle side module of the tire information management system of the first aspect <1> includes a communication time lapse measuring means for measuring communication time lapse from transmission of the command to each sensor module to reception of the response data from the sensor module and is adapted to respond, in addition to the receiving electromagnetic wave strength, to the communication time lapse observed at a previous data reception in generating the transmitting electromagnetic wave strength set value.

In a third <3> aspect of the present invention, the vehicle side module of the tire information management system of the first <1> or second <2> aspect is adapted to, in generating the transmitting electromagnetic wave strength set value, categorize at least one of the receiving electromagnetic wave strength and the communication time lapse to a plurality of groups, respectively, in accordance with levels thereof and add or subtract a difference predetermined for each group to/from the transmitting electromagnetic wave strength set value previously transmitted to the sensor module, to obtain the transmitting electromagnetic wave strength set value for the next command to the sensor module.

Effect of the Invention

In a first aspect of the present invention, the vehicle side module generates transmitting electromagnetic wave strength set value to be employed do the next data transmission by the sensor module, in accordance with the receiving electromagnetic wave strength of the data signals transmitted from the sensor module in the previous data transmission. The vehicle side module then adds this transmitting electromagnetic wave strength set value to the command to the sensor module at the next data transmission, and the sensor module controls the transmitting electromagnetic wave strength during the next data transmission on the basis of this set value. Accordingly, in a case in which the receiving electromagnetic wave strength in the previous data transmission is relatively high, it is judged that the strength of the transmitting electromagnetic wave in the previous data transmission by the sensor module is more than enough and could be lowered. Based on this judgment, the transmitting electromagnetic wave strength from the sensor module in the next data transmission can be lowered to an extent which will not disturb data transmission, whereby electricity consumption is reduced and the product life of a cell can be prolonged.

In a second aspect of the present invention, in generating a transmitting electromagnetic wave strength set value, the vehicle side module responds to, as well as the receiving electromagnetic wave strength, a communication time lapse counted between previous transmission of the command and the subsequent data reception by the vehicle side module. Accordingly, in a case in which the communication time lapse in the previous data reception is relatively short, it is judged that the strength of the transmitting electromagnetic wave in the previous data transmission by the sensor module is more than enough and could be lowered. On this judgment, the transmitting electromagnetic wave strength from the sensor module in the next data transmission can be lowered to an extent which will not disturb data transmission, whereby electricity consumption is reduced and the product life of a cell can be prolonged.

In a third aspect of the present invention, in generating a transmitting electromagnetic wave strength set value, the vehicle side module categorizes at least one of the receiving electromagnetic wave strength and the communication time lapse to a plurality of groups, respectively, in accordance with levels thereof and adds or subtracts a difference predetermined for each group to/from the previous transmitting electromagnetic wave strength set value transmitted to the sensor module, to obtain the transmitting electromagnetic wave strength set value for the next command to the sensor module. Therefore, transmitting electromagnetic wave strength, which has been reduced and is effective to reduce electricity consumption by the sensor module, can be obtained by a very simple calculation and the tire information management system can be structured in a simple manner.

BEST MODE FOR CARRYING OUT THE INVENTION

Figure 1:
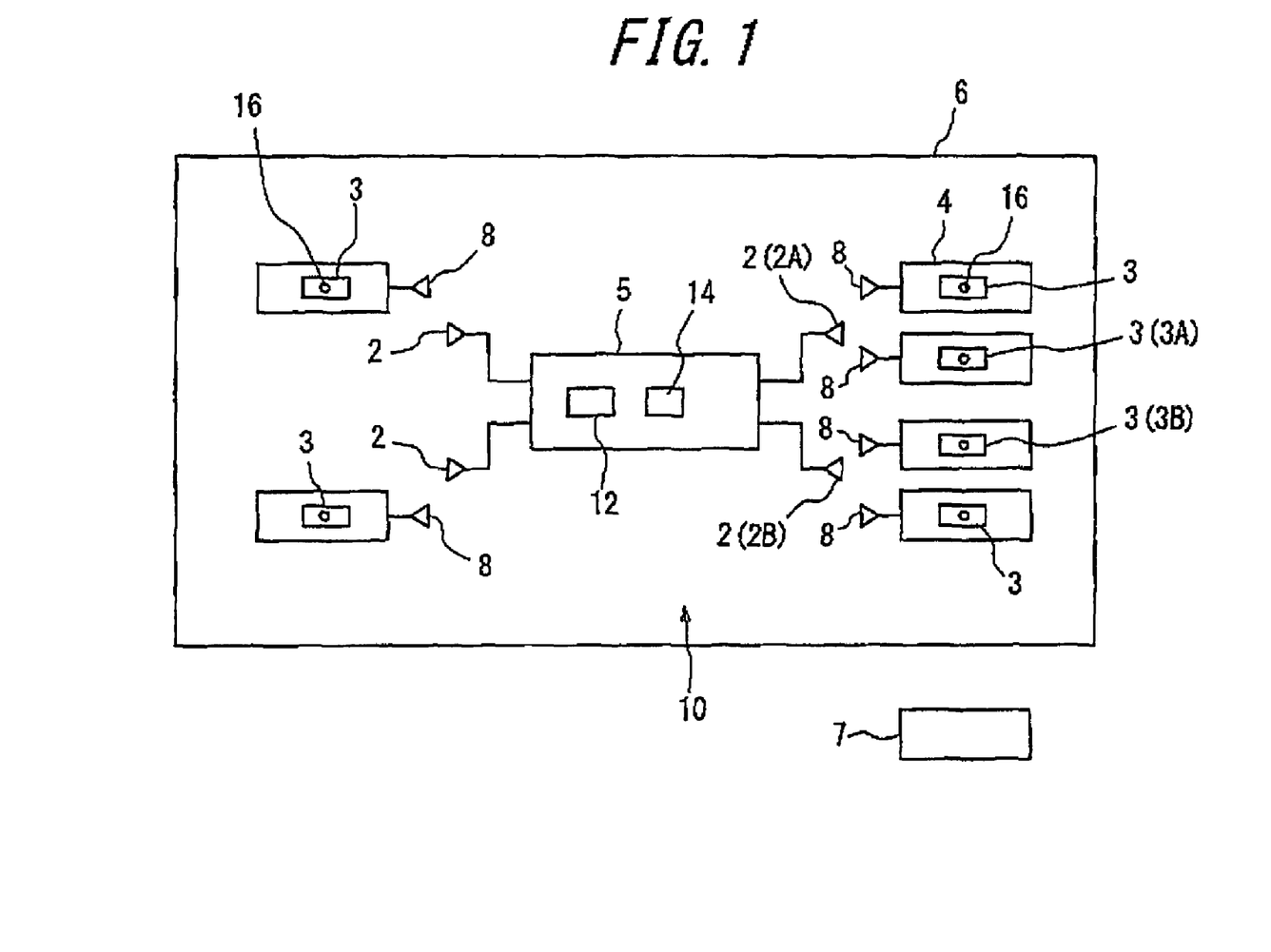
FIG. 1 is a structural view showing a tire information management system according to an embodiment of the present invention.

An embodiment of the present invention will be described hereinafter with reference to drawings. FIG. 1 is a structural view showing a structure of a tire information management system according to an embodiment of the present invention. The tire information management system 10 includes: a plurality of sensor modules 3 (six in the example shown in the drawing) provided in respective tires 4 of a vehicle 6; antennas 2 (four in the example shown in the drawing) for receiving wireless signals containing data obtained by measuring tire condition variables such as tire inner pressure and tire temperature and transmitted by way of antennas 8 of the sensor modules 3; and a vehicle side module 5 connected with the antennas 2 for obtaining data from the sensor modules 3. The vehicle side module 5 may be adapted to mutually transmit/receive information regarding a tire to/from a vehicle running management center 7 that monitors a state in which the tire is used.

Transmission/reception between the vehicle body side module 5 and the sensor module 3 during a period from transmission of a command and acquisition of data obtained by measuring tire condition variables, by the vehicle side module 5, is carried out as described below. Specifically, the vehicle side module 5 transmits to one of the sensor modules 3, e.g. the sensor module 3A, by way of the antenna 2A, a command for requesting transmission of data obtained by measuring tire condition variables. Upon receiving this command signal the sensor modules 3A transmits by way of the antenna 8 belonging thereto a signal containing the measured data to the vehicle side module 5. The vehicle side module 5 confirms reception of the measured data, completes transmission and reception between the sensor module 3A and then subsequently starts transmission and reception to/from the next sensor module 3, e.g. 3B, by way of the antenna 2 (2B).

The vehicle side module 5 carries out transmission and reception in a manner similar to that described above with respect to all of the sensor modules 3 provided in the tires 4 of the vehicle 6. When the vehicle side module 5 confirms data reception from all of the sensor modules 3, the series of operation is completed. A cycle in which this series of operation is carried out can be set as desired.

In the present embodiment, regarding the antenna 2 used in association with each sensor module 3, it is preferable that the antenna 2 which will be able to establish communication with the sensor module 3 at the highest possibility as compared with other antennas 2 is selected. For example, for one of the sensor modules 3, one of the antennas 2, which has been selected in view of only theoretical conditions such as an arrangement drawing, may be used at first. However, if such a theoretically selected antenna 2 actually has a low possibility of successfully establishing communication, another antenna 2 having the highest possibility of successfully establishing communication with respect to the sensor module 3, as compared with other antennas 2, can be selected by allowing the sensor module 3 to have communication by way of other antennas 2.

In case in which the vehicle side module 5 cannot establish communication with the targeted sensor module 3 with a sufficiently high possibility by way of any of the antennas 2, it is preferable that it is judged that the communication failed and a warning based on the judgment is transmitted to the driver or the vehicle running management center.

Figure 2:
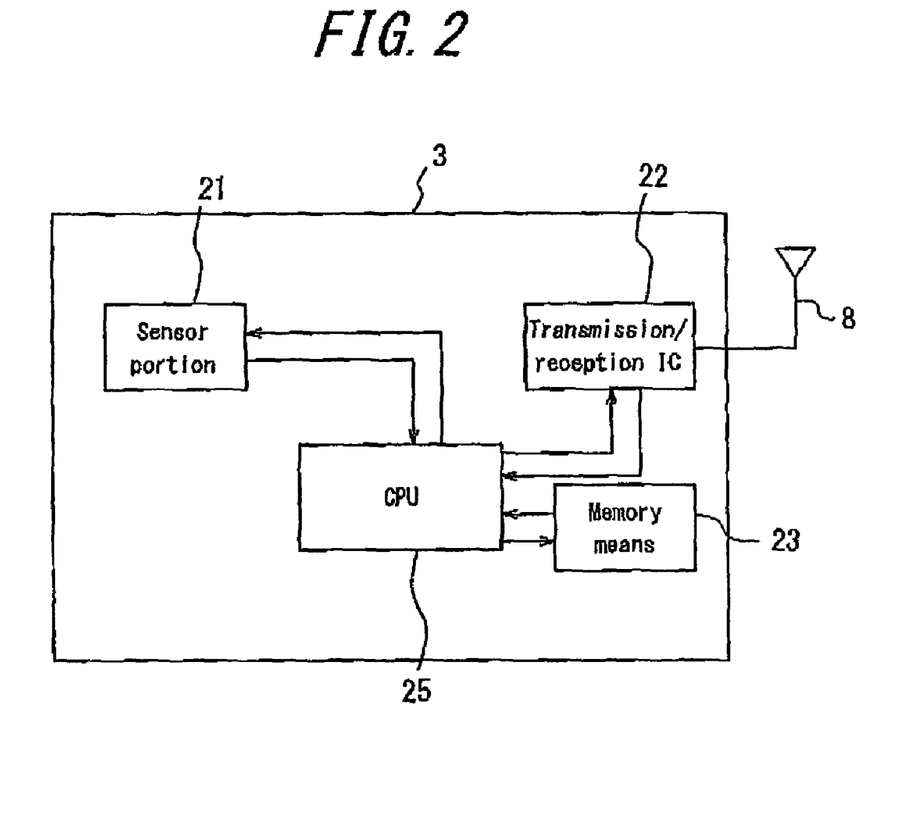
FIG. 2 is a block diagram showing a structure of a sensor module.

FIG. 2 is a block diagram showing a structure of the sensor module 3. The sensor module 3 has a sensor portion 21 for measuring tire condition variables including tire inner pressure, a transmission/reception IC 22 for receiving a command from the vehicle side module 5 and transmitting the measured date from the sensor portion 21, an antenna 8 connected to the transmission/reception IC 22, a memory means 23 such as RAM for temporally storing various set parameters, and a CPU 25 for operating a program which is in charge of operation of the sensor module 3 as a whole and controlling, based on the program, the sensor portion 21, the transmission/reception IC 22, the memory means 23 and the like as the respective components of the sensor module 3.

Figure 3:
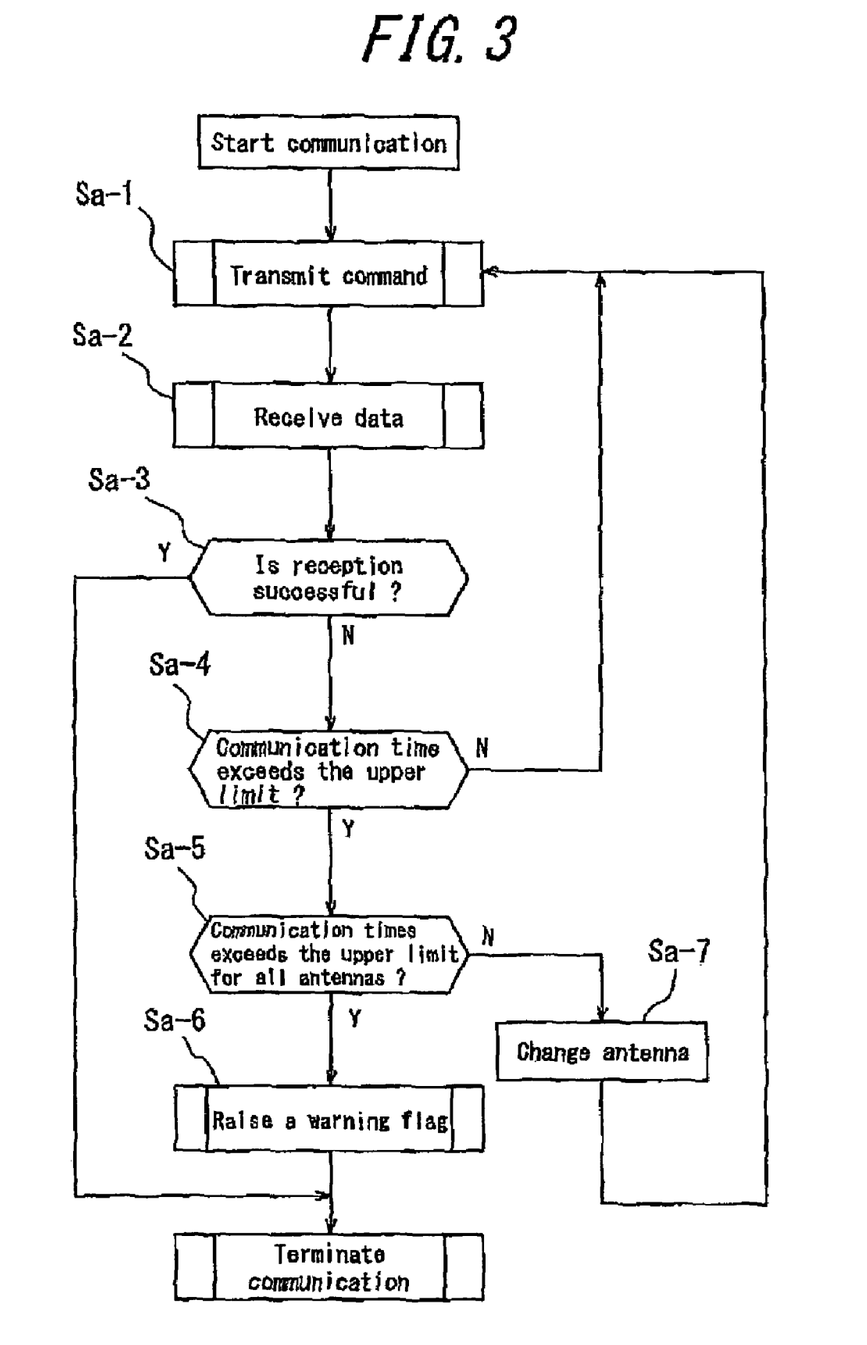
FIG. 3 is a flow chart showing a processing routine at a vehicle side module.
Figure 4:
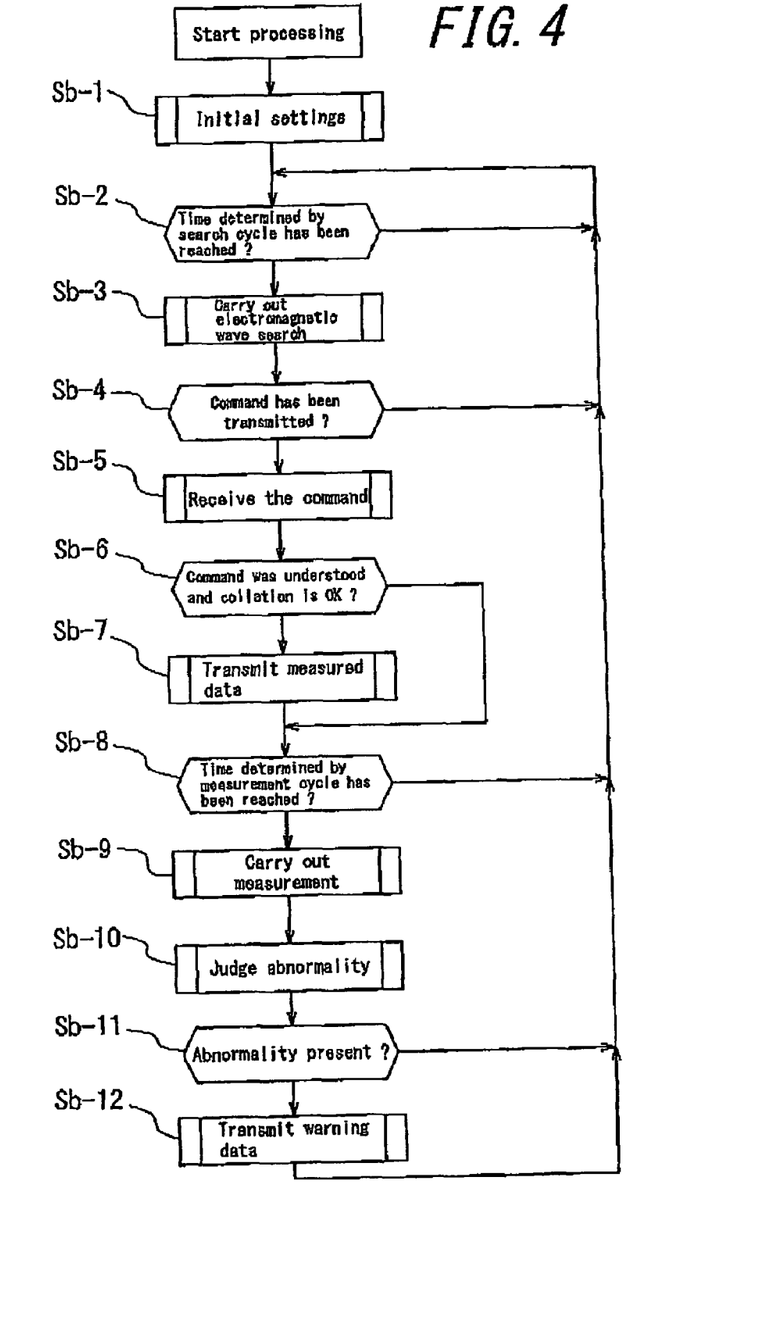
FIG. 4 is a flow chart showing a processing routine at a sensor module.

The procedure when the vehicle side module 5 and the sensor module 3 carry out the processing described above will be described further in detail with reference to the drawings. FIG. 3 is a flow chart showing a procedure for a process in which the vehicle side module 5 carries out transmission/reception with respect to one of the sensor module 3. FIG. 4 is a flow chart showing a procedure for a process at the sensor module 3.

As shown in FIG. 3, the vehicle side module 5 at first transmits a command requesting transmission of data obtained by measuring tire condition variables, to one of the sensor module 3 (step sa-1) and then carries out a process to receive the data transmitted from the sensor module 3 (step sa-2). Based on the results of this process, it is judged whether the data reception has been successfully done or not (step sa-3). In a case in which the data reception has been done successfully, the process to communicate with the one sensor module 3 is completed.

In contrast, in a case in which the data reception has failed in step sa-3, the steps from sa-1 to sa-3 described above are repeated. However, since these steps cannot be repeated endlessly, the upper limit of communication time for the repetition is set in advance. In step sa-4, it is judged whether the communication time between the vehicle side module 5 and the sensor module 3 has exceeded the upper limit or not. If the communication time has not exceeded the upper limit, the processes of steps sa-1 to sa-3 are repeated.

In a case in which the communication time has exceeded the upper limit, a process to change the antenna to be used in communicating with the targeted sensor module 3 is carried out (step sa-7), so that communication with the sensor module 3 is retried by using another antenna 2.

By the way, there may be a case in which communication must be terminated because no other antenna is available for the vehicle side module to communicate with the targeted sensor module 3. Therefore, prior to step sa-7, it is judged for each of all antennas 2 whether or not the communication time thereof has exceeded the aforementioned upper limit of communication time (step sa-5). In a case in which for all of the antennas 2 the respective communication times thereof have exceeded the upper limit, a warning flag indicating a failure in communication is raised to utilize the flag in the processing thereafter (step sa-6) and communication with the sensor module 3 is terminated.

Different from the processing procedure at the vehicle side module 5 as described above, in the processing procedure at the sensor modules 3, as shown in a flow chart of FIG. 4, at first various initial settings are carried out in step Sb-1 and then it is determined whether the time calculated according to a predetermined search period has been reached or not (step sb-2). When the time has been reached, electromagnetic wave search is carried out (step sb-3) and it is judged whether or not a command instructing data transmission has been transmitted from the vehicle side module 5 (step sb-4).

In a case in which a command has been transmitted from the vehicle side module 5, the command is received (step sb-5). Based on the reception result, if the instructions in the command are successfully understood and the ID included in the command is successfully collated with the ID of the sensor module itself (step sb-6), the sensor module transmits the measured data in accordance with the command (step sb-7).

Thereafter, it is judged whether or not the time determined by the preset specified measurement cycle has been reached (step sb-8). When the time has been reached, a tire condition variable such as tire internal pressure, tire temperature and the like, of predetermined types, is measured (step sb-9) to prepare measured data for the next data-requesting command, and a judgment on abnormality is made, i.e. it is judged whether the measured data contains abnormal values or not (step sb-10). If it is judged that the measured data contains an abnormal value in step sb-11, it is regarded as an emergency state and the sensor module 3 voluntarily transmits a warning data to the vehicle side module 5 without waiting for a command from the vehicle side module 5 side (step sb-12).

If it is judged that the measured data does not contain an abnormal value in step sb-11, the procedure returns to step sb-2 and waits until the time determined by the preset search cycle is reached.

In the present invention, as shown in FIG. 1, the vehicle side module 5 has a receiving electromagnetic wave strength measuring means 11 (12) for measuring strength of receiving electromagnetic wave when the data is received from each sensor module 3. The receiving electromagnetic wave strength measuring means 12 can be constituted of, for example, a circuit generally called RSSI (Received Signal Strength Indicator).

Further, as shown in FIG. 1, the vehicle side module 5 is preferably provided with, in addition to the receiving electromagnetic wave strength measuring means 12, a communication time lapse measuring means 14 for counting time from the time when transmission of a command to the sensor module 3 is started (step sa-1) to the time when the vehicle side module 5 has successfully received data from the sensor module 3 in step sa-3.

On the other hand, the sensor module 3 is provided with a transmitting electromagnetic wave strength control means 16 for controlling the transmitting electromagnetic wave strength to be used for data transmission to the vehicle side module 5 in step sb-7 shown in FIG. 4. The transmitting electromagnetic wave strength control means 16 is constituted of the transmission/reception IC 22 for controlling transmitting electromagnetic wave strength during data transmission, the CPU 25 for outputting a set value of transmitting electromagnetic wave strength to the transmission/reception IC 22) and a program operated by the CPU 25.

Figure 5:
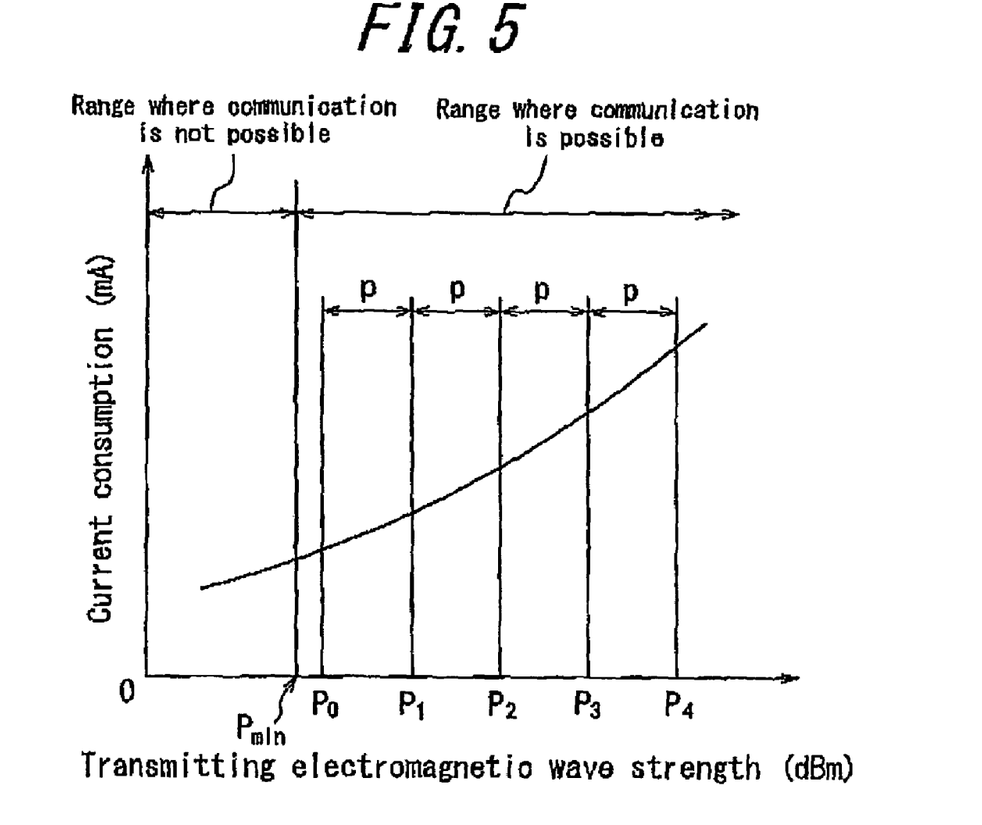
FIG. 5 is a graph showing a relationship between transmitting electromagnetic wave strength in data transmission and electricity consumption at the sensor module.

The present invention proposes reducing transmitting electromagnetic wave strength during data transmission by using the transmitting electromagnetic wave strength control means 16 to an extent that data transmission is not disturbed, so that electricity consumption is suppressed and the product life of the primary cell is significantly prolonged. FIG. 5 is a graph schematically showing, for the sensor module 3 provided in a tire, the relationship between transmitting electromagnetic wave strength and current consumption proportional to electricity consumption, with the X axis being the transmitting electromagnetic wave strength (dBm) and the Y axis being the current consumption (mA). As is obvious from the graph, electricity consumption can be reduced by lowering transmitting electromagnetic wave strength.

In an example shown in FIG. 5, $P_{min}$ represents transmitting electromagnetic wave strength below which communication with the vehicle side module 5 would no longer be possible. Accordingly, when transmitting electromagnetic wave strength is $P_{min}$ or higher, communication is possible. However, if transmitting electromagnetic wave strength satisfies this range, too high transmitting electromagnetic wave strength results in too much electricity consumption. Therefore, in the present invention, the vehicle side module 5 measures receiving electromagnetic wave strength upon receiving data from the sensor module and causes the transmitting electromagnetic wave strength control means 16 of the sensor module 3 to control transmitting electromagnetic wave strength so that the measured value of transmitting electromagnetic wave strength coincides with a predetermined value. As a result, reliability of communication can be ensured and electricity consumption can be reduced in accordance with the surrounding electromagnetic wave environment.

Specifically, in a case in which the number of levels of transmitting electromagnetic wave strength controlled or set by the transmitting electromagnetic wave strength control means 16 is reduced to, for example, five, and these levels are referred to as $P_1$, $P_2$, $P_3$, $P_4$ and $P_5$ ($P_0$, $P_1$, $P_2$, $P_3$ and $P_4$) with strength increasing in this order, $P_0$ is set as a level equal to or slightly higher then $P_{min}$, p is set as the unit electromagnetic wave strength increase, and $P_1$, $P_2$, $P_3$ and $P_4$ are set as $P_1=P_{min}+p$, $P_2=P_{min}+2p$, $P_3=P_{min}+3p$, $P_4=P_{min}+4p$ such that the respective adjacent levels differ from each other only by the unit electromagnetic wave strength increase p. As a result, transmitting electromagnetic wave strength can be effectively controlled in a simple manner.

Further, regarding selection of levels of transmitting electromagnetic wave strength to be used in each data transmission by the sensor module 3, the level of transmitting electromagnetic wave strength can be adjusted to an appropriate value by the vehicle side module 5 as the receiver of the signals feeding-back the results of the previous data transmission from the sensor module. Specifically, the control is carried out as follows.

Figure 6:
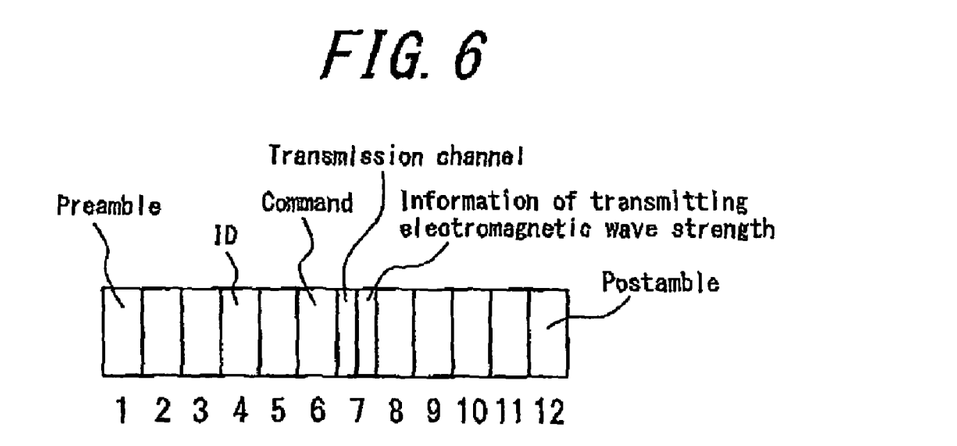
FIG. 6 is a schematic view showing a structure of a command data transmitted from the vehicle side module to the sensor module.

The vehicle side module 5, in step sa-1, transmits a command to the sensor module 3 after adding to the command a transmitting electromagnetic wave strength set value indicating the transmitting electromagnetic wave strength to be used in the next data transmission by the sensor module 3. FIG. 6 is a schematic view showing an example of a data structure transmitted in the command transmission as described above. This data has data amount of 12 byte and, given the data is sectioned to the first byte, the second byte, and the like from the leading end, the transmitting electromagnetic wave strength set value is allocated to the latter-half 4 bit position in the seventh byte. In the example shown in FIG. 6, a preamble and a postamble respectively indicating start and termination of the data are arranged at the leading end and the tail end of the data. There are allocated: the ID information of the sensor module 3 as the communication counterpart, to the fourth byte; the command information to the sensor module 3, to the sixth byte; and the information of transmission channel to be used in data transmission by the sensor module 3, to the first-half 4 bit position in the seventh byte. In the data structure described above, a number of other examples can be considered regarding the location order of the respective data.

Further, transmitting electromagnetic wave strength P in a transmitting electromagnetic wave strength set value is obtained by adding a value as a product of a positive or negative integer including zero and the unit electromagnetic wave strength increase p, to the transmitting electromagnetic wave strength $P_{bf}$ in a transmitting electromagnetic wave strength set value used in the previous command to the sensor module 3. The integer multiplied by the unit electromagnetic wave strength increase p functions as a modification parameter x. The modification parameter x is changed in accordance with the receiving electromagnetic wave strength level R measured upon the previous data reception from the sensor module 3. Specifically, when the receiving electromagnetic wave strength level R substantially coincides with the target level, the modification parameter x is set at zero. When the receiving electromagnetic wave strength level R is higher than the target level, the modification parameter x is set at a negative integer, while when the receiving electromagnetic wave strength level R is lower than the target level, the modification parameter x is set at a positive integer. Accordingly, transmitting electromagnetic wave strength $P_{bf}$ in the next data transmission by the sensor module 3 cat be modified to the optimum level.

$$P = P_{bf} + x \cdot p \quad (1)$$

Figure 7:
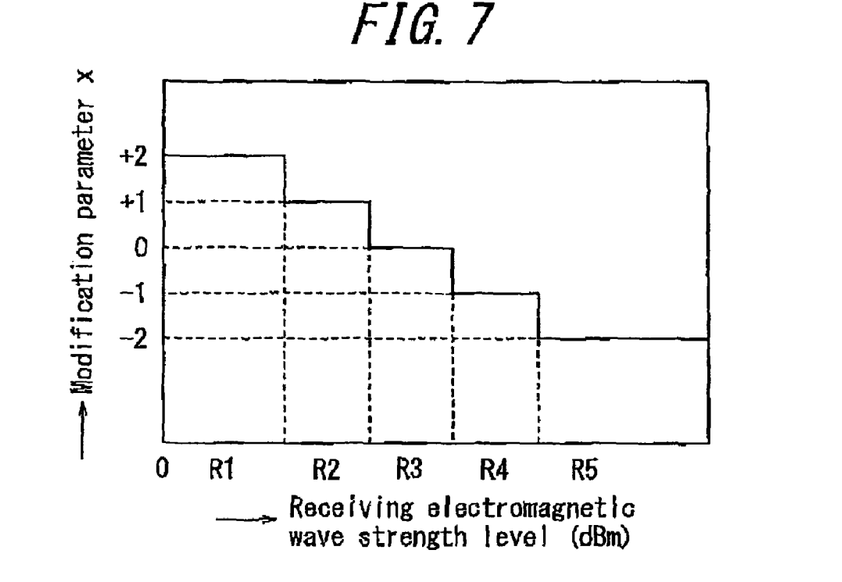
FIG. 7 is a graph showing a relationship between receiving electromagnetic wave strength in the previous data reception and a modification parameter in the vehicle side module.

FIG. 7 is a graph exemplarily showing a relationship between the receiving electromagnetic wave strength level R in the previous data reception and the modification parameter x. In this example, the receiving electromagnetic wave strength level R is classified to five groups R1, R2, R3, R4, R5 in accordance with the strength level. With respect to the receiving electromagnetic wave strength level R within the lowest level-group R1, +2 is used as the modification parameter x. For the second lowest level-group R2, +1 is used as the modification parameter x. In contrast, with respect to the receiving electromagnetic wave strength level R within the highest level-group R5, −2 is used as the modification parameter x. For the second highest level-group R4, −1 is used as the modification parameter x. For group R3 of which receiving electromagnetic wave strength level R substantially coincides with the target strength level, 0 is used as the corresponding modification parameter x.

Further, in selecting the modification parameter x, it is preferable to consider communication time lapse T in the previous data reception, as well as the receiving electromagnetic wave strength level R in the previous data reception.

Figure 8:
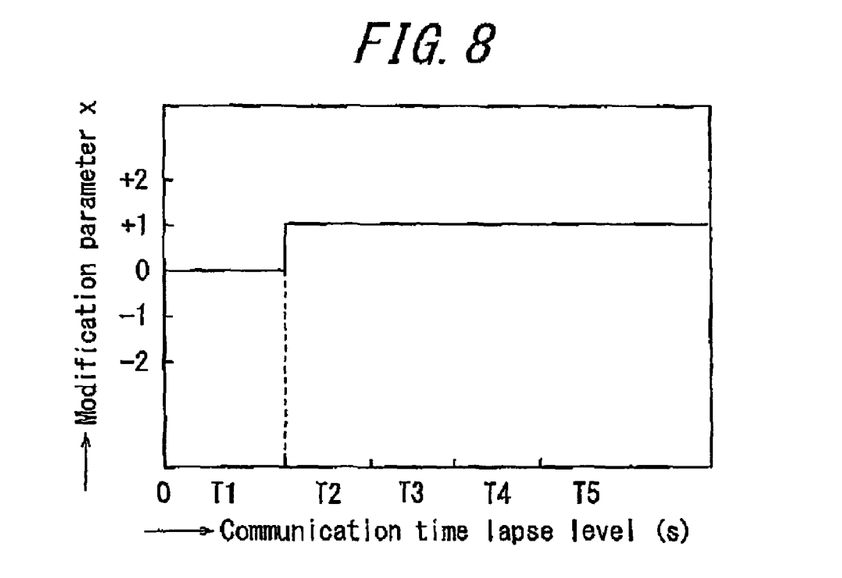
FIG. 8 is a graph showing a relationship between communication time lapse in the previous data reception and a modification parameter in the vehicle side module.

FIG. 8 is a graph exemplarily showing a relationship between the communication time lapse T in the previous data reception and the modification parameter x. In this example the communication time lapse T is categorized to five groups T1, T2, T3, T4, T5 in accordance with the lapse level. With respect to the group T1 of which communication time lapse T is shortest, zero is added/subtracted to/from the modification parameter x determined according to the receiving electromagnetic wave strength level R (that is, the modification parameter x remains unchanged), while with respect to other groups T2, T3, T4 and T5, +1 is added to the modification parameter x determined according to the receiving electromagnetic wave strength level R to obtain a new modification parameter x. Due to this, in a case in which communication time is relatively long, it is possible to control the sensor module 3 to increase transmitting electromagnetic wave strength in the next data transmission.

Further, when the communication time lapse T is also to be considered in selecting a modification parameter x the modification parameter is primarily selected according to the receiving electromagnetic wave strength level R as shown in FIG. 7 and then a modification parameter selected according the communication time lapse T as shown in FIG. 8 is added to the above primarily selected modification parameter.

As described above, in the present invention, the transmitting electromagnetic wave strength during data transmission by the sensor module 3 can be modified or set in accordance with the receiving electromagnetic wave strength R during data reception by the vehicle side module 5 and optionally further in view of the communication time lapse T. As a result, electricity consumption can be reduced without disturbing communication between the sensor module 3 and the vehicle side module 5, whereby the product life of the cell can be prolonged.

The invention claimed is:

1. A tire information management system having: a plurality of sensor modules, wherein at least one of the sensor modules is provided inside each tire mounted in a vehicle, wherein the sensor modules measure tire condition variables and transmit data obtained by analyzing the measured variables; a plurality of antennas for receiving the data from the sensor modules; and a vehicle side module for transmitting a command, requesting transmission of the data, to each sensor module by way of the antennas and obtaining the data transmitted from each sensor module, wherein:

each sensor module comprises a transmitting electromagnetic wave strength control means for controlling a transmitting electromagnetic wave strength in data transmission, the transmitting electromagnetic wave strength control means being adapted to control the transmitting electromagnetic wave strength for a next data transmission based on a transmitting electromagnetic wave strength set value received from the vehicle side module;

the vehicle side module comprises a receiving electromagnetic wave strength measuring means for measuring, for each sensor module, a receiving electromagnetic wave strength of the data signals transmitted from the respective sensor modules and adapted to generate the transmitting electromagnetic wave strength set value in accordance with the receiving electromagnetic wave strength of the data signals transmitted from the sensor modules and to add the transmitting electromagnetic wave strength set value to the command to the respective sensor modules at the next request of data transmission to the respective sensor modules, wherein the vehicle side module comprises a communication time lapse measuring means for measuring, for each respective sensor module, a communication time lapse from a transmission of the command to each sensor module to a reception of the data from the sensor module, and is adapted to modify the transmitting electromagnetic wave strength set value, based on the communication time lapse observed at a previous data reception.

2. The tire information management system of claim 1, wherein the vehicle side module is adapted to, in generating the transmitting electromagnetic wave strength set value, categorize at least one of the receiving electromagnetic wave strength and the communication time lapse into one of a plurality of levels and add to or subtract from the transmitting electromagnetic wave strength set value, a difference predetermined for each level previously transmitted to the sensor module, to obtain the transmitting electromagnetic wave strength set value for the next command to the sensor module.

3. The tire information management system of claim 1, wherein the vehicle side module transmits the command requesting the transmission of the data to a first one of the plurality of sensor modules through a first one of the antennas, and when the communication time lapse from transmission of the command to the first one of the sensors has exceeded an upper time threshold, the vehicle side module transmits the command requesting the transmission of the data to first one of the sensor modules through a second one of the antennas.

4. The tire information management system of claim 3, wherein the vehicle side module determines whether the data has been received from the first one of the sensor modules, and if the data has been received from the first one of the sensor modules, the vehicle side module transmits the command requesting the transmission of the data to a second one of the plurality of sensor modules.

5. The tire information management system of claim 3, wherein if the communication time lapses from the transmission of the command to the first one of the sensors through each of the antennas exceeds the upper time threshold, the vehicle side module transmits a warning and the transmission of the command is terminated.

* * * * *

UNITED STATES PATENT AND TRADEMARK OFFICE
CERTIFICATE OF CORRECTION

| | | |
|---|---|---|
| PATENT NO. | : 8,115,614 B2 | Page 1 of 1 |
| APPLICATION NO. | : 12/444291 | |
| DATED | : February 14, 2012 | |
| INVENTOR(S) | : Keiji Oda | |

It is certified that error appears in the above-identified patent and that said Letters Patent is hereby corrected as shown below:

Column 5, line 62, delete "11(12)" and insert --12--.

Signed and Sealed this
Tenth Day of April, 2012

David J. Kappos
*Director of the United States Patent and Trademark Office*